United States Patent [19]

Eng et al.

[11] Patent Number: 4,652,733
[45] Date of Patent: Mar. 24, 1987

[54] TECHNIQUE FOR CATALOGING PICTORIAL AND/OR WRITTEN DATABASE INFORMATION ON VIDEO TAPE OR DISK

[75] Inventors: Kai Y. Eng; On-Ching Yue, both of Middletown, N.J.

[73] Assignees: AT&T Company; AT&T Bell Laboratories, both of Murray Hill, N.J.

[21] Appl. No.: 661,292

[22] Filed: Oct. 15, 1984

[51] Int. Cl.⁴ ............................................. G06K 7/10
[52] U.S. Cl. .................................. 235/462; 235/455; 235/472
[58] Field of Search ........................ 235/455, 462, 472

[56] References Cited

U.S. PATENT DOCUMENTS 3,712,956  1/1973  Lemelson .......................... 178/6.6
3,757,037  9/1973  Bialek .............................. 358/102

OTHER PUBLICATIONS

Blum, The Information Bazaar, 6th Annual Nat. Coll. Info. Retrieval, May 8-9, 1969, Phila., Pa., pp. 133-149.
van Wijk van Brievingh, Eurocon '74, Amsterdam, The Netherlands, Apr. 22-26, 1974, pp. E2-6(1)-E2-6(2).
Billingsley, Lecture Notes In Computer Science, Data Base Techniques for Pictorial Apps., Florence, 1979, pp. 299-318.

Primary Examiner—Harold I. Pitts
Attorney, Agent, or Firm—Erwin W. Pfeifle

[57] ABSTRACT

The present invention relates to a technique for automatically cataloging and storing pictorial and/or written sections of information in the form of, for example 35-mm slides, X-rays, store catalog pages, etc. in a database for subsequent retrieval by end users of the database. In accordance with the present technique, a bar-code label, including a unique bar-code, is assigned and affixed to each piece or section of information to be separately stored in the database. Each section of information is sequentially fed into a recording arrangement where (a) the bar-code versus a brief description of the information section is recorded in a computer memory, (b) an image of the pictorial and/or written information section is transformed into a video signal and recorded on a separate location of a video tape or disk, and (c) the location of the video signal on the video tape or disk for each section of information is recorded in the computer memory with the associated bar-code and brief description.

6 Claims, 3 Drawing Figures

TECHNIQUE FOR CATALOGING PICTORIAL AND/OR WRITTEN DATABASE INFORMATION ON VIDEO TAPE OR DISK

TECHNICAL FIELD

The present invention relates to an arrangement for automatically cataloging and storing pictorial and/or written database information on video tape or disk for subsequent retrieval by end users of the database system. More particularly, a bar-code label is assigned and affixed as a permanent identification to each element to be cataloged as a part of the database. The elements are subsequently fed into an arrangement where (a) the bar code versus a brief description of the element content is recorded in a computer memory, (b) the element image is transformed into a video signal and recorded on a particular location of a video tape or disk, and (c) the location of the element on the tape or disk is recorded in the computer memory.

DESCRIPTION OF THE PRIOR ART

Rapid and up-to-date dissemination of large pictorial information to widespread users has long been a challenge to communications systems developers. Different aspects of such a service have been addressed in recent years by a wide variety of approaches such as videotex, teletex, videodisk-based and VCR-based systems. One arrangement of such system is disclosed in U.S. Pat. No. 3,757,037 issued to N. Bialek on Sept. 4, 1973. There, images, such as pages of a department store catalog, are stored on tape. By means of a keyboard, a user can narrow the stored information down to a specific small amount of items that the user wishes to view.

A common and important bottleneck in these systems is the intensive labor involved in the transfer of the pictorial and/or written database from its original printed form (e.g., 35-mm slides or color prints) to an electronic medium. As was stated at page 305 in the article by F. C. Billingsley in *Lecture Notes in Computer Science* and *Data Base Techniques for Pictorial Applications*, Florence, June 20–22, 1979, Springer-Verlag, at page 299–318, in information storage systems relating to the storage of space probe data, because of the bulk of the information to be processed, processing prior to archiving should somehow be minimized.

In storing, for example, a department store catalog on tape, thousands of pictures in a prescribed sequence must be sorted and then transferred onto a tape individually through a camera/video-tape-recorder (VTR) or camera/computer disk/VTR setup. In such operation, each picture is recorded typically as a full TV frame on the video tape (or on a high-speed computer disk first and then transferred to tape). Therefore, the recording set-up must be capable of frame-by-frame editing. While the mechanics of this frame-by-frame recording are being simplified, the first half of the authoring process is not, namely, the sorting or sequencing of the pictures before recording. The sorting process is extremely labor-intensive, and, therefore, provides a great possibility of human error. The problem, therefore, remaining in the prior art is to provide an automatic cataloging and storing system which reduces labor and error to a minimum.

SUMMARY OF THE INVENTION

The foregoing problem in the prior art has been solved in accordance with the present invention which relates to an arrangement for automatically cataloging and storing pictorial and/or written data base information on video tape or disk for subsequent retrieval by end users of the database system. More particularly, a bar-code label, including a unique bar-code, is assigned and affixed as a permanent identification to each element to be cataloged and stored as a part of the database. The pictorial and/or written elements are subsequently fed into an apparatus where (a) the bar-code versus an associated brief description of each element's content is recorded in a computer memory, (b) each element's image is transformed into a video signal and recorded on a particular location of a video tape or disk, and (c) the location of each element on the tape or disk is recorded in the computer memory with its associated bar-code and brief description.

Other and further aspects of the present invention will become apparent during the course of the following description and by reference to the accompanying drawings.

BRIEF DESCRIPTION OF THE DRAWINGS

Referring now to the drawings in which like numerals represent like elements in the several views.

DETAILED DESCRIPTION

In the description which follows, it will be assumed that the pictorial information to be stored on a video tape or disk in accordance with the present invention will comprise original picture material in the form of standard high-resolution 35-mm color slides. It is to be understood that the use of 35-mm slides is only for purposes of exposition and not for purposes of limitation. It will be readily appreciated that the inventive concept described is equally applicable to any pictorial or written information as, for example, an X-ray, a print or painting, and a page of written and/or pictorial material.

Figure 1:
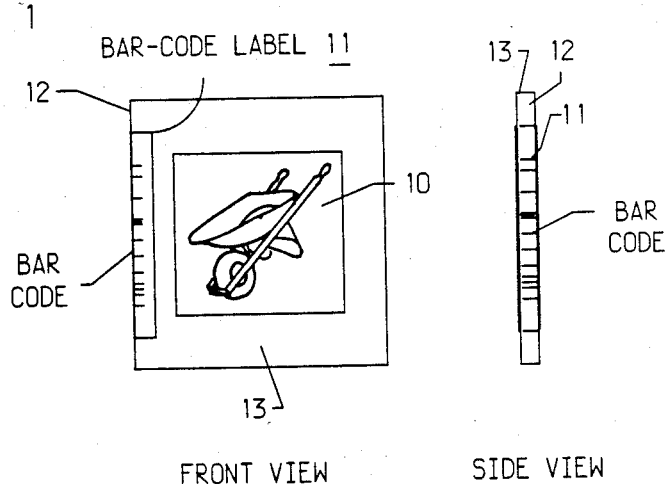
FIG. 1 illustrates an exemplary 35-mm slide with a bar-code label attached along one edge thereof, which slide is to be automatically stored as part of a database in accordance with the present invention.

In accordance with the present invention, each element to be stored as a frame of pictorial information on a video tape or disk, as part of a database, is assigned a separate bar-code such as the Universal Product Code widely used in supermarkets. At the time of the bar-code assignment, it is advantageous that a label providing that bar-code identification be affixed on the element and preferably adjacent an edge of that element, and that the bar-code and any identification information (e.g. keywords, title, etc.) be stored in a computer memory for subsequent look-up by techniques well known in the art. Such combined step avoids a future additional step of trying to match up each pictorial element with its associated bar-code label prior to storage at a time when it may not be as easily accomplished. FIG. 1 illustrates a 35-mm slide 10 with a bar-code label 11, identifying that slide and its pictorial contents, affixed by an edge 12 of slide mount 13 and wrapped around its edge 12. If the pictorial element is a thin print (e.g., poster or X-ray), then the bar-code label 11 need not be wrapped around an edge 12 but should be positioned adjacent an edge of the print where the information on the pictorial element to be stored will not be obscured.

Figure 2:
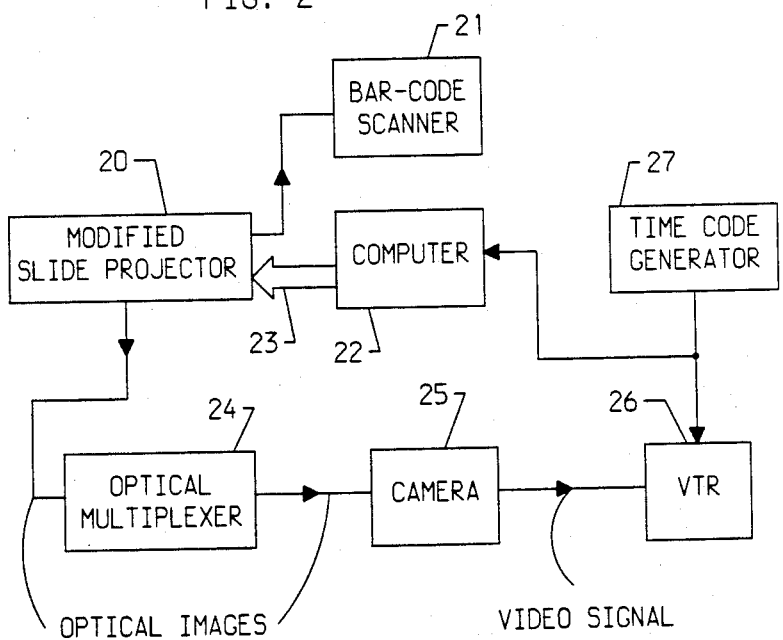
FIG. 2 is a block diagram of an automatic slide-to-tape transfer system in accordance with the present invention.

FIG. 2 illustrates a system in accordance with the present invention for recording the pictorial and/or written material on a video tape or disk, once the pictorial and/or written information has been assigned and affixed with a bar-code label. After a number of elements have been assigned their bar-code identifications, they can be gathered together and fed into a modified slide projector 20. Slide projector 20 is modified in such a way that, as each slide is dropped or moved before the projecting lens, the bar-code label on each slide is visible externally either on the side or front of the slide. An optical bar-code scanner 21 is appropriately positioned near the lens of projector 20, as shown in FIG. 3, to read the bar code of each slide as it is dropped or moved before projection.

The bar-code information is supplied to a computer 22, which can be made to also control the operation of modified slide projector 20 via a cable 23. The slide image 10 is coupled through an optional optical multiplexer 24, for maximum picture quality, to a video camera 25 which transforms the visual image into a video signal. The video signal from camera 25 is then recorded on a video tape recorder (VTR) 26, or a video disk recorder, while a time code signal (comprising either a Society of Motion Picture and Television Engineers, SMPTE, time code or a Vertical Interval Time code) from a Time Code Generator 27, forming part of VTR 26, is also being recorded in computer 22 so that the exact video tape (or disk) location of each slide image can be specified and stored in the memory of computer 22.

Typically, a slide projector 20 can be run in the automatic mode at a rate faster than one picture per 3 seconds. If a VTR such as the Model BVH-2500 from SONY is used, which can record frame by frame without tape spooling, then each slide image can be recorded individually as it becomes available from projector 20 and multiplexer 24. Each two hour tape can then store as many as 216,000 pictures. It should be noted that the slide images have been stored on the tape in arbitrary order, and the listing showing the slide contents with their bar-code and exact tape locations is stored in the memory of computer 22. Fortunately, tape-to-tape editing on a computer-controlled, frame-by-frame, random-access basis is easily obtainable in the SONY Model BVH-2500 VTRs, and the final assembly of the pictorial information into a coherent frame-by-frame database can thus be done conveniently as long as the pictures are already stored on tapes.

Figure 3:
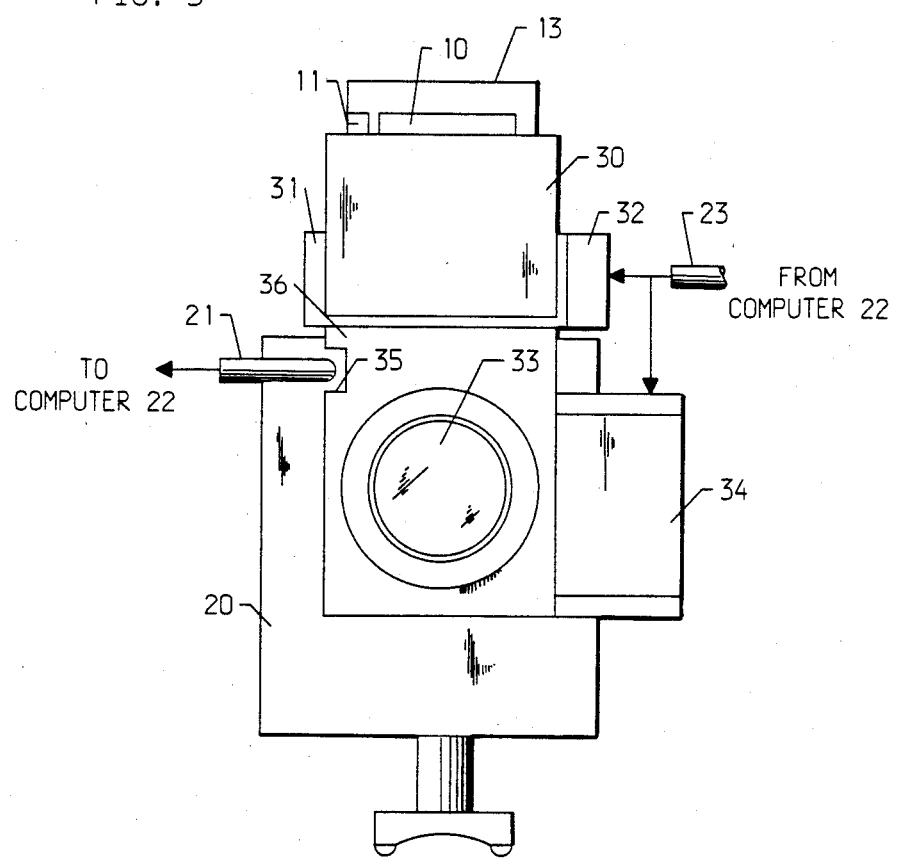
FIG. 3 is a front view of an exemplary slide projector and bar-code reader for use in the system of FIG. 2.

FIG. 3 illustrates an exemplary modification to a slide projector 20. The modified slide projector 20 is actually an ordinary automatic slide projector including, for example, a tray or carrousel 30 for holding a number of slides 13 including the images 10 and the bar-code labels 11. Tray or carrousel 30 is positioned in a carrier 31, which can include a remote activating device 32 that is controlled by computer 22 for moving tray or carrousel 30 sufficiently to permit a next slide 13 to drop in front of projecting lens 33. Simultaneous with, or just prior to, the movement of tray or carrousel 30 to introduce the next slide in front of projection lens 33, computer 22 can activate a device 34 for removing a just projected slide 13 from in front of projection lens 33 and into the same or some other tray, carrousel or retaining device.

Ordinary slide projector 20 is modified to cut a slit 35, or other cut-out, in the side of a chute 36 where a slide 13 drops behind projecting lens 33. Slit 35 can be covered with a transparent plastic cover. Optical bar-code scanner 21 is mounted next to, and aimed at, slit 35. In operation, as a slide 13 is dropped from tray or carrousel 30 down behind projection lens 33, its bar-code is visible in slit 25 from the outside, and the slides 13 vertical motion enables optical bar-code scanner 21 to read the bar-code thereon properly.

Optical multiplexer 24 is not strictly required, but in order to provide a grain-free and uniformly illuminated image for the video camera 25, an optical multiplexer such as the Buhl Uniplexer is highly desirable as it transfers the slide image directly to camera 25 via a lens arrangement without any intermediate screen or frosting surface. VTR 26 can be, for example, a one-inch broadcast-type recorder, as such recorder offers the best picture quality with the necessary editing capability. It is to be understood, however, that any other suitable device can be used for the above-mentioned multiplexer 24 and VTR 26.

The foregoing discussion has dealt specifically with the storage of information on slides on a video tape or disk. The concept could also be applied to flat pictorial or written information as, for example, X-Rays, pictures, paintings, and pages of a store catalog. With such information, the bar-code label need only be affixed at some position which does not obscure the information to be stored. The X-Ray, etc. can be positioned and appropriately illuminated in a holder or frame with video camera 25 being used to directly input the frame information to VTR 26 while a hand held or automatically activated bar-code scanner 21 is moved along the bar-code label 12 to provide computer 22 with the bar-code of the information being recorded. Computer 22 also obtains the location of the stored information on the tape or disk from Time Code Generator 27 to complete the information stored in the memory of computer 22 with respect to a particular X-ray, etc.

What is claimed is:

1. A method for cataloging and storing information in a database including any combination of pictorial and written information, the method comprising the steps of:
   (a) randomly taking separate sections of information from a plurality of sections of information to be used in forming a database and affixing a bar-code code label, including a unique bar-code, as a permanent identification to each section of information;
   (b) recording the unique bar-code identification affixed in step (a) to each section of information along with a brief description associated with that section of information to be stored in the database in a separate location of a computer memory;
   (c) taking individual ones of the plurality of sections of information with the affixed bar-code labels thereon produced in step (a) in any sequence, and transforming each section of information into a video signal while generating a first output signal indicative of the bar-code affixed to that section of information;
   (d) recording the video signal from step (c) in a separate location on a video signal storage medium while concurrently generating a second output signal indicative of the storge location of the video signal on the video signal storage medium; and (e) concurrent with steps (c) and (d), locating the computer memory location formed in step (b) which includes the bar-code indicated by the first output signal from step (c), and recording in that computer memory location the storage location of the video signal on the video signal storage medium as indicated by the associated second output signal generated in step (d) to merge all information assocaiated with each section of information in the separate associated memory location of the database.

2. Apparatus for automatically cataloging and storing sections of information disposed on thin layers of material and forming a database, where each section of information includes any combination of pictorial and written information the apparatus comprising:

video signal generating means comprising:

transforming means for (a) both reading a bar-code label including a unique bar-code which is affixed to a section of information to be stored in the database and generating a first output signal representative of the unique bar-code, while (b) transforming the section of information to be stored in the database into a corresponding video signal; and means for both (a) storing the video signal associated with a section of information from the transforming means in a separate location of a video signal storage medium, and (b) generating a second output signal indicating the location of the video signal on the video signal storage medium; and computer means comprising a plurality of memory locations for entering pertinent data about the sections of information which are taken in any random sequence, each memory location being used to store data associated with a separate section of information to be stored in the database, the data to be stored comprising a brief description and the unique bar-code affixed to that section of information; and a processor responsive to the first output signal from the video signal generating means for (a) accessing the memory location storing the bar-code indicated by the first output signal, and (b) recording the location of the video signal on the video signal storage medium as indicated by the associated second output signal from the video signal generating means.

3. A method for cataloging and storing information according to claim 1 wherein each section of information to be stored in the database is pictorial information in the form of a photographic slide, the method comprising the further steps of:

(f) in performing step (a), affixing the bar-code label at an edge of the photographic slide;

(g) in performing step (c), performing the steps of:

(g1) reading the bar-code information as the bar-code label on each photographic slide passes a bar-code scanner disposed adjacent a slide projector to generate the first output signal during a period when the photographic slide is being moved into or out of position for projection by said slide projector; and (g2) transforming the projection of each photographic slide from the slide projector into a video signal with a video camera.

4. A method of cataloging and storing information according to claim 1 wherein each section of information to be stored in the database is disposed on a thin layer of material.

5. Apparatus for cataloging and storing information according to claim 2 wherein each section of information is in the form of a photographic slide and the transforming means comprises:

projection means for both moving each photographic slide to be stored in the database passed a bar-code scanning means and projecting the photographic slide image; and video signal generating means for converting the photographic slide image projected by the projection means into a corresponding video signal.

6. Apparatus for cataloging and storing information according to claim 5 wherein the apparatus further comprises:

an optical multiplexer disposed between the projection means and the video signal generating means for receiving the projected image from the projection means and providing a grain-free and uniformly illuminated image of the photographic slide to the video signal generating means.

* * * * *